United States Patent [19]

Davenport et al.

[11] 4,455,865

[45] Jun. 26, 1984

[54] METHOD AND DEVICE FOR LOCATING A FIXED POINT OF REFERENCE RELATIVE TO A PREDETERMINED SEGMENT OF ROTARY MEMBER

[75] Inventors: Clair H. Davenport, Morgantown; Richard B. Combs, Columbus; Dennis A. Wilber, Elizabethtown, all of Ind.

[73] Assignee: Cummins Engine Company, Inc., Columbus, Ind.

[21] Appl. No.: 337,016

[22] Filed: Dec. 31, 1981

[51] Int. Cl.³ ............................................. G01M 15/00
[52] U.S. Cl. .................................. 73/116; 33/180 AT
[58] Field of Search ...................... 73/118, 119 A, 116; 33/1 N, 180 AT, 181 AT, DIG. 15; 123/343

[56] References Cited

U.S. PATENT DOCUMENTS

| | | | |
|---|---|---|---|
| 2,776,494 | 1/1957 | Sheppard | 33/181 AT |
| 4,066,949 | 1/1978 | Condrac | 324/207 X |
| 4,385,867 | 5/1983 | Straubel et al. | 73/119 A X |

Primary Examiner—Jerry W. Myracle

Attorney, Agent, or Firm—Neuman, Williams, Anderson & Olson

[57] ABSTRACT

A device is provided for locating a fixed point of reference with respect to a predetermined segment of a rotary member while the latter is disposed in a selected position of rotary adjustment. The device includes a bracket adjustably mounted on a support spaced from the rotary member. Removably mounted on the bracket and adjustable independently thereof is an elongated alignment element. The alignment element and the bracket coact with each other and with the support whereby the end of the element is aligned with the predetermined segment of the rotary member when the latter is in said selected position of rotary adjustment. While the element end is so positioned the bracket is fixedly secured to the support. The element is then removed from the fixedly secured bracket and an elongated detecting piece is mounted on the bracket in substitution of the removed alignment element. An end of the detecting piece is positioned proximate the predetermined segment of the rotary member and defines the fixed point of reference.

11 Claims, 7 Drawing Figures

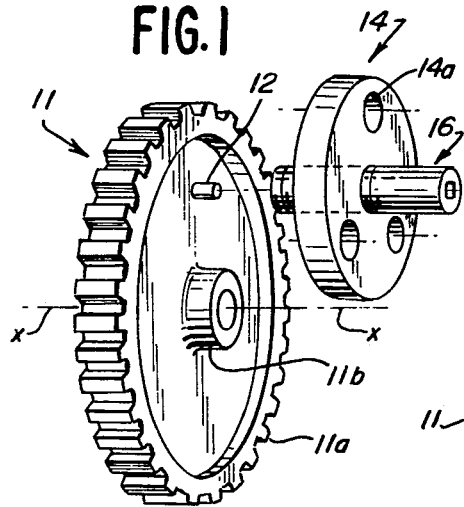
FIG. 1
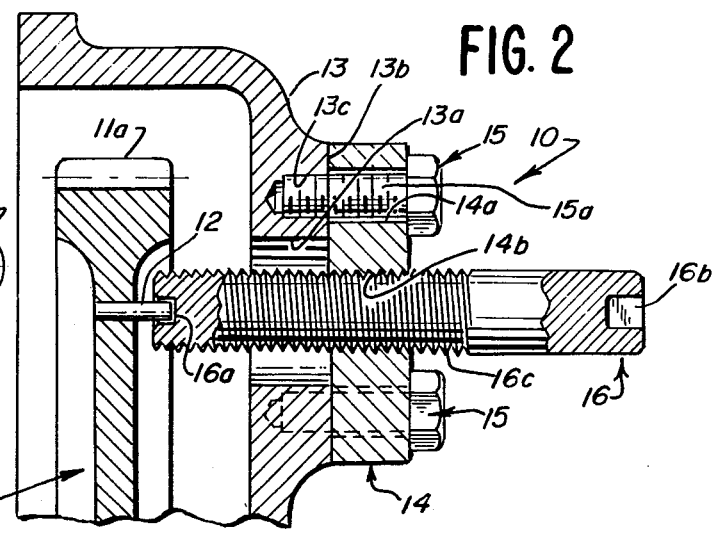
FIG. 2
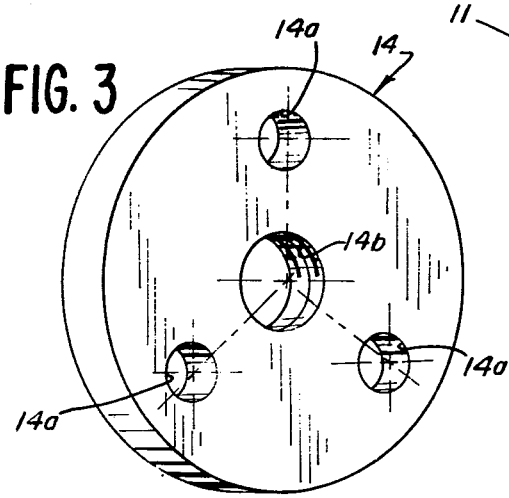
FIG. 3
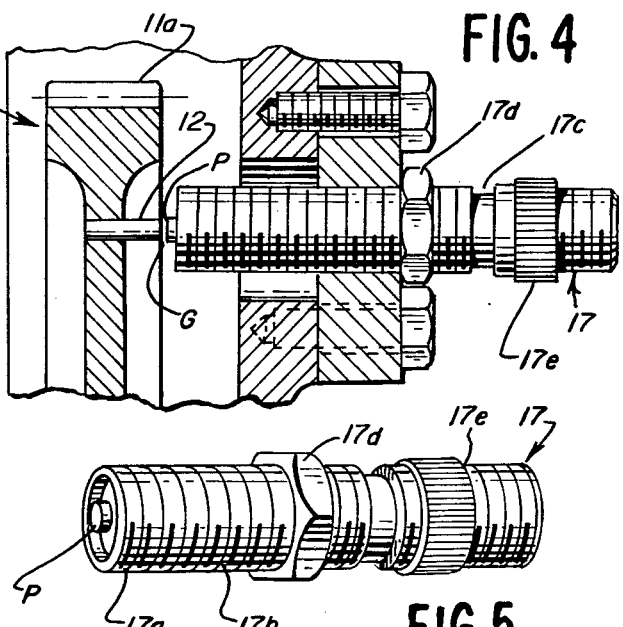
FIG. 4
FIG. 5
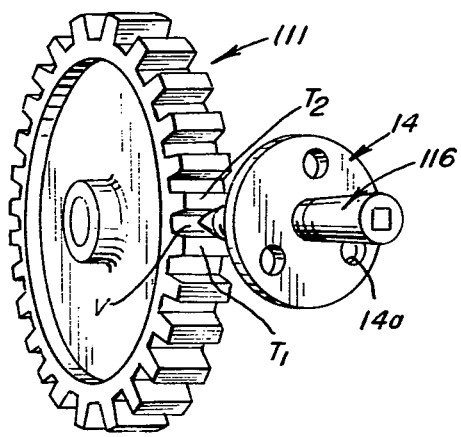
FIG. 6
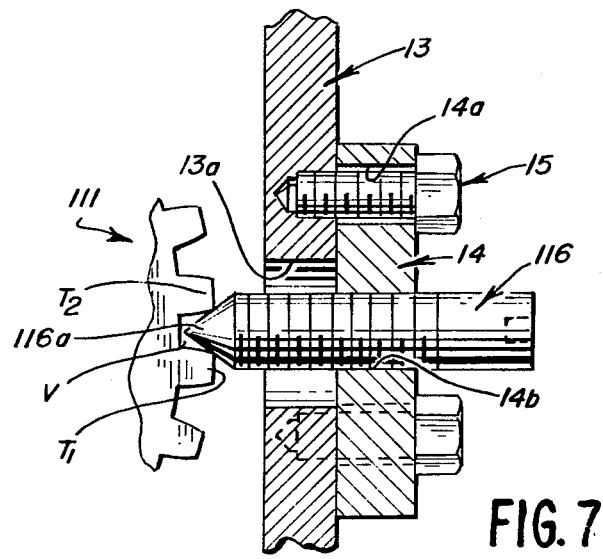
FIG. 7

4,455,865

METHOD AND DEVICE FOR LOCATING A FIXED POINT OF REFERENCE RELATIVE TO A PREDETERMINED SEGMENT OF ROTARY MEMBER

BACKGROUND OF THE INVENTION

In numerous internal combustion engines utilizing electronic injector systems it is extremely important in order to obtain optimum engine performance that a magnetic pickup be precisely located relative to either a pin carried on a cam gear, or a valley formed between selected teeth of a gear mounted on the engine crankshaft. Heretofore it has been extremely awkward, difficult, and time-consuming to attain the desired location of the magnetic pickup and the preciseness of the location relied primarily on the skill and experience of the mechanic involved. Because of the normal concealment and remoteness of the gear in question, the locating of a magnetic pickup oftentimes became a rather hit or miss type of manipulation. Various special and costly tools and implements were frequently employed to assist in locating the pickup; however, because of inherent design characteristics these tools and implements were of a complex and fragile construction; required the talents of a skilled mechanic to operate properly; and could not be readily adjusted to compensate for variations in engine design.

SUMMARY OF THE INVENTION

Thus, it is an object of the invention to provide a device of the type described which overcomes the aforenoted shortcomings associated with prior devices.

It is a further object to provide a method for precisely locating a magnetic pickup which is simple, expeditious, and doesn't require the talents of a skilled mechanic.

It is a still further object to provide a device and method of locating a magnetic pickup which is reliable and may be utilized with engines which vary in size and operating capabilities over a wide range.

Further and additional objects will appear from the description, accompanying drawing, and appended claims.

In accordance with one embodiment of the invention a device is provided for locating a fixed point of reference with respect to a pin carried on a cam gear when a selected piston of the engine is at top dead center. The device is mounted on a support having an access opening adjacent the gear pin. The device includes a bracket which is adjustably mounted on the support so as to overlie the access opening. Removably mounted on the bracket is an alignment tool. The tool is independently adjustable relative to the bracket so that an end of the tool extends through the access opening and is disposed adjacent the gear pin. By relative adjustment of the bracket with respect to the support and the tool with respect to the bracket, the end of the tool is brought into axial engagement with the gear pin while the gear is in a stationary position and a selected piston of the engine is disposed at a top dead center position. Once the tool end is in axial engagement with the gear pin, the bracket is fixedly secured to the support and then the alignment tool is removed from the bracket. An elongated detecting piece, such as a magnetic pickup, is mounted on the fixedly secured bracket in substitution for the removed alignment tool. The detecting piece is adjusted relative to the bracket so that the end of the piece is disposed proximate the gear pin.

DESCRIPTION

For a more complete understanding of the invention, reference should be made to the drawings wherein:

FIG. 1 is a fragmentary perspective view showing one form of a bracket and an alignment element mounted thereon and with the end of the element being aligned with a pin carried on a gear.

FIG. 2 is an enlarged fragmentary sectional view showing the end of the alignment element in encompassing relation with the gear pin; the bracket is shown fixedly mounted on a support; the section is taken along a vertical plane which includes the longitudinal axis of the alignment element.

FIG. 3 is a perspective view of the bracket per se shown in FIG. 2.

FIG. 4 is similar to FIG. 2 but showing a detecting piece substituted for the alignment element.

FIG. 5 is a perspective end view of the detecting piece per se shown in FIG. 4.

FIG. 6 is a perspective view, similar to FIG. 1, showing a modified alignment element with the end thereof aligned with a valley formed between a pair of selected adjoining teeth, the latter being formed on the periphery of a gear.

FIG. 7 is an enlarged fragmentary perspective view of the alignment element of FIG. 6 with the end thereof disposed within the selected valley of the gear. Referring now to the drawing and more particularly to FIGS. 1, 2, and 4, one form of the locating device 10 is shown in combination with a cam gear 11, the latter oftentimes being referred to as a timing gear. The gear 11 in the illustrated embodiment is provided with external gear teeth 11a and a pin 12 which is positioned intermediate the gear teeth and a hub 11b. The pin 12 projects from one face of the gear in a direction substantially parallel with the axis x—x of the gear. As seen in FIG. 2, the gear 11 is disposed within a suitable housing 13 which forms a part of the internal combustion engine E. The housing is provided with an access opening 13a which is aligned with the path of travel of pin 12 as the gear rotates. The exterior portion 13b of the housing circumjacent opening 13a is preferably machined to a planar surface.

Adjustably mounted on surface 13b is a bracket 14. In the illustrated embodiment, bracket 14 is provided with a plurality of openings 14a which are symetrically arranged about a center bore 14b which is internally threaded. The bracket is secured to portion 13b by anchor bolts 15 which are threaded into holes 13c formed in the housing portion. It is important to note that the openings 14a are substantially oversize relative to the diameter of the shanks 15a of the anchor bolts. Also the access opening 13a formed in the housing is substantially larger than the diameter of an alignment element 16 which is mounted on the bracket 14 in a manner as will be described more fully hereinafter. Thus, by reason of the oversize of bracket openings 14a and access opening 13a, lateral adjustment or shifting of the bracket with respect to the surface portion 13b can be readily accomplished so as to permit accurate alignment of the element 16, sometimes referred to as an alignment tool, with respect to the gear pin 12. Once the bracket has been properly positioned, the anchor bolts are tightened and the bracket is supported by surface portion 13b.

In the embodiment of the device shown in FIGS. 1-3, the alignment element (tool) 16 is an elongated cylindrical rodlike member having an axial pocket 16a formed in the concealed end thereof which is sized to accommodate gear pin 12. The entry to the pocket is preferably chamfered to facilitate inserting of the pin into the pocket. The opposite or exposed end of the tool 16 may be provided with a suitable recess 16b or cross-slot to accommodate either the end of an Allen wrench or the tip of a conventional screwdriver or some other suitable implement.

A substantial portion of the tool exterior is provided with external threads 16c which engage the internal threads formed in bracket opening 14b and thus, allow controlled axial adjustment of the tool relative to the bracket and thereby permit the gear pin 12 to be inserted into pocket 16a. Once the pin is disposed within pocket 16a, the mechanic knows that the tool 16 precisely defines or locates a point of reference for the gear.

Once the tool is accommodating the gear pin 12 and the anchor bolts 15 have been drawn up tight, thus affixing the bracket to the supporting housing portion 13b, the tool is withdrawn from the pin and removed from bracket 14. In substitution of tool 16, a detecting piece 17, such as a conventional magnetic pickup, is threaded into the bracket opening 14b so that the leading end 17a thereof is disposed in close proximity to the distal end of pin 12. The leading end 17a includes an axially disposed pole P. The pickup 17 includes an elongated barrel section which is provided with external threads 17b which match the external threads 16c of alignment element 16. Thus, by reason of this relationship, the mechanic can accurately set the gap G between the end of the gear pin 12 and the pole P so that the pin can be accurately detected by the pole of the pickup as the gear rotates during operation of the engine.

The section 17c of the pickup which is exposed and projects outwardly from the bracket 14 is provided with a suitable faceted shoulder 17d to facilitate turning of the pickup relative to the bracket opening 14b. In addition to the shoulder 17d, the section 17c is provided with a suitable cable connector 17e.

In utilizing device 10 where gear 11 is a cam gear the mechanic rotates the gear until a selected piston of the engine (e.g. number one piston) assumes a top dead center position within its respective cylinder. With the gear in such position, the pin 12 is located on the gear so that it is accessible from the access opening 13a in the engine housing 13. Once the gear pin 12 is accessible through opening 13a, the mechanic places the bracket 14 on the supporting surface 13b so that the axis of opening 14b appears to be in substantial axial alignment with the axis of pin 12. The tool is then threaded into opening 14b so that the end of the pin 12 will be accommodated in pocket 16a. To accomplish this condition might require shifting of the bracket relative to supporting surface 13b. The mechanic can feel by turning the tool within opening 14b, when the end of pin is in the pocket because the bracket is restrained from shifting by the gear pin. When this condition occurs the mechanic securely tightens the anchor bolts 15, fixing the bracket 14 to the supporting surface. The tool is then removed from the bracket and the detecting piece 17 positioned on the bracket. To determine the size of the gap G between the end of the pin and the pole P, the mechanic may adjust the piece 17 relative to the bracket 14 until the pole and the end of the pin are in abutting contact. The mechanic then adjusts the piece so that the pole backs away from the pin the desired distance. The desired distance can be accurately determined by the number of turns of the piece relative to the threaded opening 14b formed in the bracket because the lead of the threads is known.

A modified alignment element (tool) 116 is illustrated in FIGS. 6 and 7 and is utilized when it is desired to locate a valley V between two selected adjoining teeth $T_1$, $T_2$ formed on the periphery of a gear 111. The gear in this latter instance may be mounted directly on the crankshaft, not shown, of the engine. The principal difference between element 16 and 116 is that the inner or concealed end 116a of element 116 is pointed rather than being provided with a pocket. As seen in FIG. 7, the pointed end 116a is positioned within the valley V formed between the selected teeth $T_1$, $T_2$. The pointed end is cone-shaped so that the tapered surface will engage the adjacent teeth and thus, cause the tip of the pointed end to be properly centered in the valley V. The method of positioning the element 116 relative to the selected valley V is the same as that previously described with respect to alignment element 16.

Thus, it will be seen that a simple method and device has been described which facilitates locating a fixed point of reference, such as a magnetic pickup, relative to a predetermined segment (gear pin or gear valley) of a rotary member. The device may be readily attached to an engine housing or the like and manipulated by a mechanic of ordinary skill. Various types of detecting pieces and alignment elements may be substituted for those illustrated without departing from the scope of the invention. Furthermore, the configuration and size of the bracket may also vary from that shown and will depend upon the size and location of the access opening.

We claim:

1. A device for locating a fixed point of reference relative to a predetermined segment of a rotary member when the latter is disposed in a selected position of rotary adjustment, said device comprising a bracket mounted for independent adjustment on a supporting surface provided with an access opening adjacent the path of travel of the predetermined segment; means for securing said bracket in a selected position of adjustment on said support; an elongated alignment element removably mounted on said bracket for insertion through the access opening and selective independent movement towards and away from the predetermined segment of the rotary member while the latter is in the selected position of rotary adjustment, said alignment element and said bracket being movable as a unit on said supporting surface to effect alignment of an end of the alignment element with respect to the predetermined segment; and an elongated detecting piece mounted on said bracket in substitution of said alignment element subsequent to said bracket having been fixedly secured to said supporting surface while the rotary member is disposed in said selected position of adjustment, said detecting piece having an end thereof adapted to be disposed proximate the predetermined segment of the rotary member and defining the fixed point of reference.

2. The device of claim 1 wherein the predetermined segment of the rotary member is of ferrous metal and the detecting piece is a magnetic pickup having a pole defining the fixed point of reference and disposed in close proximity to the path of movement of the predetermined segment during rotation of the rotary member.

3. The device of claim 1 wherein the predetermined segment of the rotary member includes a piece of ferrous metal spaced from the rotary axis of the rotary member and projecting in a direction substantially parallel to the rotary axis; the alignment element end being provided with a pocket for releasably accommodating the projecting pin when said element is mounted on the bracket and the latter is disposed in said selected position of adjustment relative to the supporting surface; and said detecting piece includes a magnetic pickup.

4. The device of claim 1 wherein the rotary member is a gear; and the alignment element end is adapted to be disposed within a valley formed between adjoining gear teeth when the bracket disposed in said selected position of adjustment relative to the supporting surface, the valley being a part of the predetermined segment of the gear.

5. A device for use with an internal combustion engine for locating a point of reference relative to a pin carried on a cam gear when a selected piston of the engine is disposed at top dead center; said device comprising a bracket mounted for independent movement on a supporting surface provided with an access opening adjacent the path of travel of the gear pin; an elongated alignment element removably mounted on said bracket and having an end thereof adapted to extend through the access opening, said alignment element being movable independently of said bracket towards and away from the gear pin, said alignment element and said bracket being movable as a unit relative to the supporting surface to effect alignment of the end of said alignment element with respect to the gear pin when the selected piston of the engine is at top dead center; means for securing said bracket to the supporting surface when said element end is aligned with the gear pin; and a magnetic pickup mounted on said bracket in substitution of said alignment element whereby a pole of the magnetic pickup is positioned adjacent to and in alignment with the gear pin and defines the point of reference.

6. The device of claim 1 wherein a portion of the alignment element is threadably mounted on said bracket and said detecting piece has a corresponding portion threadably mounted on said bracket when said detecting piece is substituted for said alignment element.

7. The device of claim 5 wherein the end of the alignment element is provided with a pocket for accommodating the gear pin.

8. A method of locating in an internal combustion engine a magnetic pickup relative to a predetermined segment of a gear when a selected piston of the engine is disposed at top dead center; said method comprising adjustably mounting a bracket on a supporting surface having an access opening adjacent the path of travel of the predetermined segment so that a portion of the bracket registers with the access opening and is in substantial alignment with the predetermined segment of the gear; mounting an elongated alignment element on said bracket portion so that an end of the element extends through the access opening towards the predetermined segment while the gear is in a stationary position and the selected piston of the engine is disposed at top dead center; adjusting the bracket and the alignment element as a unit relative to the supporting surface and the alignment element relative to the bracket so that the end of the element is in alignment and engagement with the predetermined segment; fixedly securing the bracket to the supporting surface while the end of the element is in said alignment and engagement with the predetermined segment; removing the alignment element from the fixedly secured bracket; mounting the magnetic pickup on the bracket in substitution of the alignment element; and adjusting the pickup relative to the bracket whereby a pole of the pickup is in closely spaced relation with respect to the predetermined segment of the gear.

9. The method of claim 8 wherein the aligned portion of the bracket is an internally threaded opening and an exterior portion of the alignment element is threadably mounted in the bracket opening and a corresponding exterior portion of the magnetic pickup is threadably mounted in the bracket opening when the pickup is substituted for the alignment element.

10. The method of claim 8 wherein the predetermined segment of the gear includes a pin and the alignment element is adjusted endwise relative to the bracket whereby an end pocket formed in the element embraces the pin while the gear is in a stationary position.

11. The method of claim 8 wherein the predetermined segment of the gear includes a valley formed between selected adjoining gear teeth and the alignment element is adjusted relative to the bracket whereby a tapered end formed in the alignment element is disposed within the valley between the selected gear teeth; while the tapered end of the element is so disposed, the bracket is fixedly secured to the supporting surface; the alignment element is removed from the fixedly secured bracket; the magnetic pickup is mounted on the bracket in substitution of the removed alignment element; and the pickup is adjusted relative to the bracket whereby a pole of the pickup is in closely spaced relation with respect to the valley between the selected gear teeth.

* * * * *